United States Patent [19]

Makino et al.

[11] 4,225,352
[45] Sep. 30, 1980

[54] ANTI-CORROSIVE PIGMENT AND ANTI-CORROSIVE AQUEOUS PAINT

[75] Inventors: Hajime Makino; Wataru Shinoda; Kazuhiro Yamamura, all of Hiroshima, Japan

[73] Assignee: Toda Kogyo Corp., Hiroshima, Japan

[21] Appl. No.: 912,737

[22] Filed: Jun. 5, 1978

[30] Foreign Application Priority Data

Jun. 30, 1977 [JP] Japan .................................. 52-78898

[51] Int. Cl.$^2$ .............................................. C09D 5/08
[52] U.S. Cl. .............................. 106/14.21; 106/14.39; 106/14.44; 106/304; 106/306; 252/387; 260/29.2 EP; 260/29.2 E; 260/29.6 MM; 260/37 EP; 260/40 R; 260/42; 423/594
[58] Field of Search ................... 106/14.21, 14.39, 304, 106/306, 14.44; 423/594; 252/387

[56] References Cited

U.S. PATENT DOCUMENTS 3,519,386   7/1970   Fedock et al. ....................... 423/594
3,904,421   9/1975   Shimizu et al. ..................... 260/40 R

FOREIGN PATENT DOCUMENTS

50-126000 10/1975 Japan .
50-40419  12/1975 Japan .
51-30887   9/1976 Japan .
53-7451    3/1978 Japan .

Primary Examiner—Lorenzo B. Hayes
Attorney, Agent, or Firm—Stevens, Davis, Miller & Mosher

[57] ABSTRACT

An anti-corrosive pigment comprises an ion oxide-calcium oxide sintered composite of an average particle size in a range of 0.7–7 μm, which contains at least 25% by weight of $2CaO.Fe_2O_3$ and has a extremely low water-solubility of calcium content. An anti-corrosive aqueous paints contains the above pigment and has a superior storage stability without causing a gellation.

6 Claims, 3 Drawing Figures

ANTI-CORROSIVE PIGMENT AND ANTI-CORROSIVE AQUEOUS PAINT

BACKGROUND OF THE INVENTION

This invention relates to an improved anti-corrosive pigment comprising an iron oxide-calcium oxide sintered composite and to an improved anti-corrosive aqueous paint containing the pigment.

As well known, anti-corrosive pigments are widely used at present in a shipbuilding industry and a building industry for preventing the generation of rusts in iron material.

Anti-corrosive paints generally involve those consisting of a paint forming matrix, composed of vehicle (resin), solvent and extender pigment, coloring pigment, drier, surface active agent and the like, blended with anti-corrosive pigment. The conventional anti-corrosion paints well known so far include those composed of the foregoing paint forming matrix blended with an anti-corrosive pigment such as a lead compound, for example, red lead oxide, basic lead sulfate, a chromate series compound, for example, zinc chromate, strontium chromate or the like, etc.

In recent years, however, environmental pollution caused by noxious metals such as lead, chromium and the like have come to the fore and the production and the use of the red lead oxide, basic lead sulfate, zinc chromate, strontium chromate and the like essentially consisting of lead, chromium or the like are gradually restricted.

Accordingly, provision of non-pollutant anti-corrosive pigment as a substituent for the above lead compounds, chromate compounds and the likes has been highly demanded in the industries concerned. In response to the foregoing demand of the industry, the inventors of the present application have made a study long since and established a novel technique of using as the anti-corrosive pigment a powder comprising iron oxide-calcium oxide sintered composite which is prepared under the specific production conditions (refer to Japanese Pat. No. 855,733 and U.S. Pat. No. 3,904,421).

The process of producing the anti-corrosive pigment developed by the inventors and the effects obtained therefrom are to be described hereinafter.

Referring at first to the process for the production, it comprises the steps of mixing 40–70% by weight, calculated as iron oxide, of an iron compound and 30–60% by weight, calculated as calcium oxide, of a calcium compound, calcinating the mixture at a temperature between 700–1150° C. to produce an anti-corrosive pigment of iron oxide-calcium oxide sintered composite containing more than 5% $2CaO.Fe_2O_3$.

The anti-corrosive effect of the anti-corrosive pigment obtained by the process above described owes to the presence of $2CaO.Fe_2O_3$ therein and the mechanism is as follows.

$2CaO.Fe_2O_3$ reacts with water into $3CaO.Fe_2O_3.nH_2O$ and, at the same time, turns basic through the dissolved calcium ions. Moreover, a part of the calcium ions turns to calcium hydroxide with the action of water and another part of the calcium ions turns to carbonate products with the action of gaseous carbon dioxide. In the course of the conversion into $3CaO.2Fe_2O_3.nH_2O$, it is hydrated with water as water of crystallization. Consequently, $2CaO.Fe_2O_3$, when deposited on the surface of a steel plate or the like, keeps the surface of the plate basic by its basicity. Moreover, it forms a tight coating film on the surface of the steel plate due to the formation of carbonate products and, in addition, reduces the moistures present on the surface of the steel plate by hydrating them as water of crystallization. The above phenomena provide a strong anti-corrosive effect.

However, an anti-corrosive aqueous paint containing the above iron oxide-calcium oxide sintered composite has been unfortunately encountered a problem that gellation occurs in the paint during storage thereof and makes it impossible to use in some cases.

The reason why the gellation occurs will be explained below. It is generally known that a pigment in a paint, when it is chemically active (for example basic), reacts with a resin in the paint-forming matrix to form a metal soap. Those substances tend to form such metal soaps include metals such as Pb, Mn, Cu, Al, Zn, Cr and Ca. The above anti-corrosive pigment developed by the inventors shows its anti-corrosive effect by the reaction of $2CaO.Fe_2O_3$ contained therein with water as foregoings. Accordingly, in an aqueous paint containing the above anit-corrosive pigment, some $2CaO.Fe_2O_3$ is dissolved out into water which is employed as a solvent to form calcium ions, whereby rapid reaction between the dissolved calcium ions and the resin is taken place to produce a metal soap causing the gellation to occur in the paint. Therefore the above iron oxide-calcium oxide sintered composite, if used as it is as the anti-corrosive pigment to produce the anti-corrosive aqueous paint, the resulted paint has an extremely poor storage stability and, in an extreme case, causes gellation already in the course of the paint production. Since the gellation in the paint is caused through the above mechanism, gellation can be prevented by minimizing the amount of water which is used as the solvent, whereby the calcium component dissolved in water can be decreased in proportion to the reduction of water in the paint. Since the pain thus produced is a high viscosity paint or a high resin solid content (NV), it can be used by adding an appropriate amount of water to dilute the paint in a viscosity suited to caoting application. However, in this case the paint left after the use gells as well during storage.

SUMMARY OF THE INVENTION

Accordingly, an object of this invention is to provide an improved and effective anti-corrosive aqueous paint having a superior storage stability without causing the gellation.

Another object of this invention is to provide an improved anti-corrosive pigment to be incorporated into the above paint, which pigment has a extremely low water solubility of calcium component therein as well as a long lasting anti-corrosive effect.

Other object, features and attending advantages of the invention will become more apparent from the following detailed description with reference to the accompanying drawings.

In accordance with the foregoing and other objects of this invention, the inventors provide an anti-corrosive pigment prepared by mixing 57–70% by weight (calculated as $Fe_2O_3$) of iron compound selected from the group consisting of $Fe_2O_3$, $Fe_3O_4$ and FeOOH with 30–43% by weight (calculated as CaO) of calcium compound selected from the group consisting of CaO, $CaCO_3$ and $Ca(OH)_2$, calcinating the mixture at a temperature in a range of 1150°–1400° C. to form an iron oxide-calcium oxide sintered composite containing at least 25% by weight of 2CaO.Fe$_2$O$_3$ and then pulverizing the resultant sintered composite into powder of an average particle size between 0.7–7µ.

BRIEF DESCRIPTION OF THE DRAWINGS

FIG. 1 is a graph showing the relation between the calcinating temperature for obtaining iron oxide-calcium oxide sintered composite and the grain size of 2CaO.Fe$_2$O$_3$ in the iron oxide-calcium oxide sintered composite and the rate of dissolution thereof, FIG. 2 and FIG. 3 shown X-ray diffraction diagrams respectively, wherein

DETAILED DESCRIPTION OF THE INVENTION

The inventors have made a long study for obtaining anti-corrosive aqueous paint which possesses the anti-corrosive pigment of iron oxide-calcium oxide sintered composite and does not result gellation during storage of the paint due to the formation of the metal soap.

It will be apparent that the gellation in the paint can be prevented by removing, from the paint, a calcium component which tends to react with the resin to form a metal soap, in other words, water soluble calcium.

The 2CaO.Fe$_2$O$_3$ in the above iron oxide-calcium oxide sintered composite is indispensible for maintaining the anti-corrosive effect, although soluble to water and undesired in view of storage of the aqueous paint.

The calcium component which is soluble to water and may cause gellation in the paint is present in the pigment as 2CaO.Fe$_2$O$_3$ in the iron oxide-calcium oxide sintered composite and calcium oxide (CaO) contained as unreacted products in the sintered composite. Then, the inventors intend to retard the rate of dissolution of 2CaO.Fe$_2$O$_3$ and carry out the sintering reaction completely to minimize the inclusion of unreacted calcium oxide.

As the results of the study on the relation between the calcium ions dissolved out from the pigment and the paint gellation in the aqueous paint, as well as various experiments, the inventors have found that the paint can satisfy the storage stability and show a long lasting anti-corrosive effect where the calcium content soluble to water is less than 1% by weight, based on the measuring method shown below.

The method of measuring calcium component dissolved into water is as follows:

(1) Pour 200 ml conditioned water (ion-exchanged water with more than 100×10$^4$ Ωcm) in a 300 ml beaker washed with the conditioned water and kept them at 30° C. in a thermostable bath.

(2) Weigh out 0.2 g specimen on a direct reading balance and place it in 200 ml conditioned water kept at 30° C.

(3) Transfer the beaker in an ultrasonic disperser maintained at 30° C. and disperse the specimen while agitating with a glass rod for 2 minutes.

(4) Transfer the above beaker again to the thermostable bath kept at 30° C. and leave for 20 minutes.

(5) Filter the dispersant through filter papers (No. 5C) by about 70 ml into a 200 ml beaker.

(6) Wash a 50 ml pipette with the filtration and then take a 50 ml portion of the filtrate into a 500 ml tall beaker.

(7) Add 10 ml 2 N potassium hydroxide solution to adjust pH to about 13.0.

(8) Add a small amount (one ear pick) of an indicator, Dottite NN (trade name, from DONIN Yakukagaku Kenkyusho, which comprises 2-hydroxy-1-(2-hydroxy-4-sulfo-1-naphthylazo)-3-naphthoic acid).

(9) Titrate with EDTA (ethylenediaminetetraacetic acid) (0.01 M). The end point is specified whereat the red colors turns to blue.

(10) The amount of calcium (as CaO) dissolved out is determined from the amount of EDTA required for the titration based on the following equation:

$$CaO\ (\%) = \frac{0.0005608 \times \text{amount of EDTA required (ml)} \times 4}{0.2} \times 100$$

The inventors have also made various experiments and studies in order to reduce the water soluble calcium content to less than 1% by weight in the iron oxide-calcium oxide sintered composite mainly consisting of 2CaO.Fe$_2$O$_3$, when measured based on the above method.

Figure 1:
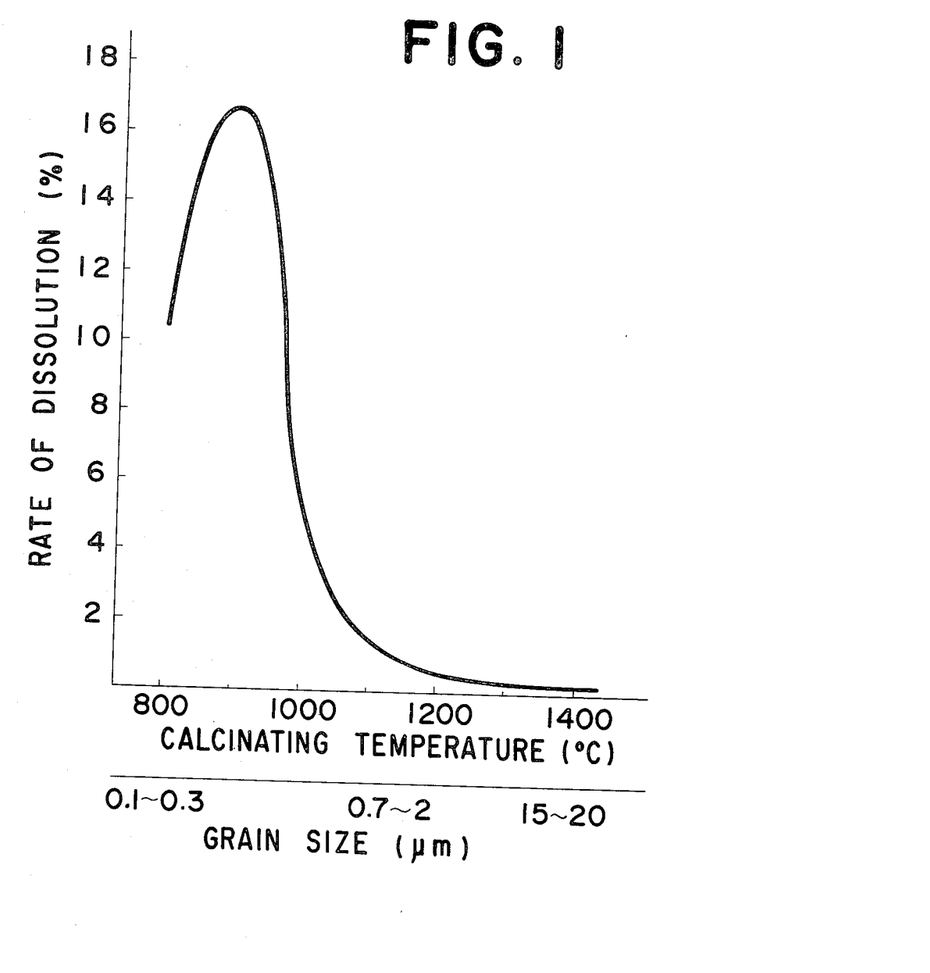

Since it is generally known that the rate of dissolution of a water-soluble powder can be retarded by decreasing the surface area of the powder, that is, by increasing the aggregate size, particle size, grain size and the like, the inventor, at first, pulverized the iron oxide-calcium oxide sintered composite mainly consisting of 2CaO.Fe$_2$O$_3$, which were prepared at a specified calcination temperature (950° C.) and had a constant grain size (about 0.4µ) to obtain powder having various aggregate sizes, and measured the calcium component dissolved into water according to the above measuring method. However, no remarkable difference in the rate of dissolution were observed due to the difference in the sized of the aggregates. Then, the inventors examined the changes in the rate of dissolution due to the difference in the particle sizes. As the result it was found that while the rate of dissolution can be retarded more by increasing the particle size with the equivalent grain size as compared with the case for varying the aggregate size. The amount of the dissolved calcium component, however, can not be decreased less than 1% by weight by merely controlling the particle size. Then, based on the assumption that the grain size gives the most significant effect on the rate of dissolution, the inventors caused 2CaO.Fe$_2$O$_3$ grains of various grain sizes to grow and measured the rate of dissolution thereof. The grain size of 2CaO.Fe$_2$O$_3$ increased in proportion to the calcination temperature for producing the same, that is, the grains grow into sizes of about 1–0.3µ about at 700° C., about 0.7–2µ about at 1150° C. and about 15–20µ about at 1400° C. It was found that the rate of dissolution is retarded as the grain size increases. The relation between the grain size and the rate of dissolution is as shown in FIG. 1, which is a graph showing the relation between the calcination temperature and the grain size of 2CaO.Fe$_2$O$_3$ produced at the calcinating temperature and the water soluble calcium component measured by the foregoing method. As apparent from FIG. 1, water soluble calcium content is remarkably high for the grain size below about 0.7–2µ and the water soluble calcium component reduces less than 1% by weight for the grain size about 0.7–2µ where the calcination temperature for the production of $2CaO.Fe_2O_3$, is set at above 1150° C.

The present invention is to be described in more details. Referring at first to the starting materials for the preparation of present anti-corrosive pigment. $Fe_2O_3$, $Fe_3O_4$ and FeOOH are selected as iron compounds which is one of the starting materials. $Fe_2O_3$, $Fe_3O_4$ and FeOOH may be produced by any processes. $Fe_3O_4$ and FeOOH are converted into $Fe_2O_3$ through calcination at a temperature range referred to hereinafter and behave quite in the same way as $Fe_2O_3$ in the present invention. $Fe_2O_3$, $Fe_3O_4$ and FeOOH can be used alone or in admixture.

In addition to the above three types, other iron compounds such as $FeSO_4$, $FeCl_2$, $Fe(NO_3)_2$ and the like are easily available but unsuitable as the starting materials in the present invention since they are salts of strong acids.

As a calcium compound which is the other starting material, any type can be used so long as it can decompose at a calcination temperature range referred to later and react with the above iron compound, but preferred are those selected from calcium carbonate, calcium hydroxide, and calcium oxide alone or in combination.

While the calcium compounds generally include calcium sulfate, calcium chloride and the like, they are the salts of strong acids and so unsuited as the starting materials in the present invention.

Reference is to be made for the composition of the starting materials.

The composition for the starting materials, that is, the blending ratio for the starting materials is very important in the present invention, and one or more iron compounds selected from the group consisting of $Fe_2O_3$, $Fe_3O_4$ and FeOOH and one or more calcium compounds selected from the group consisting of calcium carbonate, calcium hydroxide and calcium oxide have to be blended in such a ratio that the resulted mixture consists of 57–70% by weight, calculated as iron oxide ($Fe_2O_3$) of the former and 30–43% by weight, calculated as calcium oxide (CaO) of the latter.

The reason for this blending ratio is to be described below.

The conditions for producing $2CaO.Fe_2O_3$ which is the essential substance for the contribution to the anti-corrosive effect in the present invention has already been clarified, and it is known that $2CaO.Fe_2O_3$ can be produced at an almost 100% yield where 58.5% by weight of the iron compound (as $Fe_2O_3$) and 41.5% by weight of the calcium compound (as CaO) are mixed and calcinated at a temperature above 1100° C. The yield of $2CaO.Fe_2O_3$ decreases as the ratio of the iron compound increases and $2CaO.Fe_2O_3$ is produced no more with the iron compound above 74.1% by weight (as iron oxide). Although $2CaO.Fe_2O_3$ is produced with the iron compound less than 58.5% by weight (as iron oxide) corresponding to the amount of the iron compound, unreacted calcium oxide is also resulted simultaneously.

The reason for sepcifying the lower limit in the blending ratio for the starting materials (with respect to iron compound) is to be described at first.

It is undesired as already mentioned to contain high water soluble calcium content in the resulted iron oxide-calcium oxide sintered composite. With the iron compound less than 58.5% by weight (as iron oxide), the sintered composite resulted after the calcination contains the unreacted calcium oxide as mentioned above. The calcium oxide is a substance easily soluble to water as well known and, if contained more than 1% by weight in the sintered composite, it results in undesired effect such as causing gellation in the resin when the sintered composites are used as a paint pigment for the preparation of an aqueous paint even if the dissolving amount of $2CaO.Fe_2O_3$ into water are decreased. Accordingly, the blending ratio for the starting materials should be controlled so that less than 1% by weight of unreacted calcium oxide is contained in the resulted sintered composites, that is, more than 57% by weight of the iron compound (as iron oxide) and less than 43% by weight of calcium compound (as calcium oxide) must be blended.

Next, the reason for specifying the upper limit (for the iron compound) in the blending ratio of the starting materials will be described below.

For the blending ratio of the iron compound above 58.5% by weight (as iron oxide), $CaO.Fe_2O_3$ is formed together with $2CaO.Fe_2O_3$. Since $CaO.Fe_2O_3$ is water insoluble, it results in no gellation at all in the resin. However, it is undesired in this invention to increase the yield for $CaO.Fe_2O_3$, that is, to reduce the yield for $2CaO.Fe_2O_3$ since the essential object of the invention is to provide an anti-corrosive pigment and $CaO.Fe_2O_3$ has no anti-corrosive effects at all. The inventors have confirmed on the basis of our various experiments and studies that a significant anti-corrosive effect can be attained where more than 25% by weight of anti-corrosive $2CaO.Fe_2O_3$ is present in the iron oxide-calcium oxide sintered composite. In view of the above, the blending ratio for the starting materials must be such as to provide less than 70% by weight of the iron compound as iron oxide and more than 30% by weight of the calcium compound as calcium oxide in order to contain more than 25% by weight of $2CaO.Fe_2O_3$ in the sintered composite.

Consequently, the iron compound and the calcium compound have to be compounded in the blending ratio of 57–70% by weight of the iron compound as iron oxide and 30–43% by weight of the calcium compound as calcium oxide so as to restrict the amount of easily water soluble substance (in particular unreacted calcium oxide) in the sintered composite to such a level as not to result adverse effects upon preparing an aqueous system using the sintered composite and so as to present more than 25% by weight of $2CaO.Fe_2O_3$ in the sintered composite to effectively provide an anti-corrosive effect.

Referring now to the calcination temperature, the restriction for the temperature range is one of the important factors for the control of the rate of dissolution of the resulted sintered composite into water in the present invention and the temperature should lie within a range between 1150°–1400° C.

At a temperature lower than 1150° C. in the present invention, although the resulted iron oxide-calcium oxide sintered composite can be mainly composed of $2CaO.Fe_2O_3$ having an excellent anti-corrosive effect, crystal grains of $2CaO.Fe_2O_3$ have a grain size of about $0.7\mu$ or less and so dissolve out at a rate above 1% by weight. Accordingly gellation occurs in the course of the storage after preparing the paint and, in an extreme case, even in the course of the preparation.

On the other hand at a temperature above 1400° C., the crystal grains of $2CaO.Fe_2O_3$ can be grown sufficiently to restrict the content of water soluble calcium to less than 1% by weight. Such a high temperature is, however, not desired since it results in a molten state for a wide range upon reaction for forming $2CaO.Fe_2O_3$ and thereby causing particles to grow into coarser ones that can not be pulverized. Moreover, such molten products undesirably deposited on the wall of the furnace.

In the calcination temperature in a range between 1150° and 1400° C., and using the foregoing starting materials in a blending ratio above described, a desired iron oxide-calcium oxide sintered composite can be obtained, which contains more than 25% by weight of $2CaO.Fe_2O_3$ and has at most 1% by weight of the water-solubility of calcium according to the foregoing measuring method.

Pulverization of the iron oxide-calcium oxide sintered composite is to be described next.

The iron oxide-calcium oxide sintered composite prepared has to be pulverized after the calcination into particles with average grain size of 0.7–7 μm in order to be used as an anti-corrosive pigment.

As already described, when the iron oxide-calcium oxide sintered composite is prepared in the foregoing manner, some crystal grains of $2CaO.Fe_2O_3$ grow into particles of about 15–20 μm depending on the calcination temperature and such grains further coagulate together into coarser blocks. The resulted iron oxide-calcium oxide sintered composite should, therefore, be pulverized if it is used as the anti-corrosive pigment, into a grain size as required for the anti-corrosive pigment. Generally, the anti-corrosive pigment should be ground to less than average particle size of about 7 μm.

While on the other hand, if the sintered composite is pulverized to less than 0.7 μm of average particle size, the dissolving amount of the iron oxide-calcium oxide sintered composite into water exceeds the 1% by weight of the upper limit. This eliminates the effect of limiting the dissolving rate obtained by the restriction of the calcination temperature range for the control of crystal grain size.

Therefore, the iron oxide-calcium oxide sintered composite should be pulverized into average particle size ranging between 0.7–7 μm.

While no particular grinding means are necessary for obtaining the average particle size in the above range, the following grinding methods or grinding machines are desirably employed, for example.

Specifically, depending on the hardness of the iron oxide-calcium oxide sintered composite, that is, depending on the calcination temperature or grain size, coarse pulverization is at first effected by a roll crusher and then medium pulverization is effected by a hammer mill. Thereafter, fine pulverization is effected by a vibration mill to obtain a desired average particle size.

While excellent anti-corrosive pigments can be produced within the above production conditions (composition for the starting materials calculated as oxides, calcination temperature), as shown also in the examples to be described later, the production conditions advantageous from industrial point of view include the followings:

As starting materials, $Fe_2O_3$ and carbonate of calcium (calcium carbonate) are advantageous in view of easy availability and cost.

As the composition for the starting materials, the blending ratio of 58.5% by weight of $Fe_2O_3$ and 41.5% by weight of calcium carbonate as calcium oxide (CaO), which results after the calcination the iron oxide-calcium oxide sintered composite consisting of almost 100% $2CaO.Fe_2O_3$, is advantageous.

As a calcination temperature, a temperature in a range between 1200° and 1300° C. is advantageous in view of easy pulverization and cost.

Referring to the pulverization of the iron oxide-calcium oxide sintered composite, it is, desirably, ground into an average particle size of 1–3 μm in view of easy pulverization and the succeeding application to the paint.

The anti-corrosive aqueous paint according to the present invention can be obtained by blending, into a paint-forming matrix, the iron oxide-calcium oxide sintered composite powder (0.7–7 μm of average particle size) containing more than 25% by weight of $2CaO.Fe_2O_3$ as an anti-corrosive pigment.

The anti-corrosive aqueous paint composition according to the present invention is in the form of a well known water soluble paint or water dispersible (emulsion) paint employed conventionally comprising vehicle (resin) and water as essential ingredient and extender pigment, coloring pigment, drier, surface active agent and the like blended therewith if required.

The vehicle (resin) can be properly selected depending upon the types of the paint to be prepared such as water-soluble paint, water dispersible paint or the like and conditions of using the paint, and the typical examples that can be used include alkyd resin, epoxy resin, acrylic resin and the like.

Water is mainly used as the solvent but other solvents such as butyl cellosolve, butanol and the like can also be co-used as well.

The extender pigment and the coloring pigment can be selected depending on the purpose of use from the group of known pigments, and the typical examples thereof include iron oxide pigments such as $Fe_2O_3$, $Fe_3O_4$, FeOOH and the like, powdered calcium carbonate, titanium white, clay and the like. Those extender pigments and coloring pigments which are tend to react with the resin to form metal soap should be avoided as well.

The drier can be selected from the known driers depending upon the kinds of the resin used and the typical examples thereof include naphthenates such as cobalt, lead, zinc and manganese naphthanates, linoleates such as cobalt, lead, zinc and manganeses linoleate.

As the surface active agent, those having a capability of improving the milling characteristics of the anti-corrosive pigment, extender pigment and coloring pigment can be used selected from the known surface active agent group depending on the requirement.

Various additives conventionally used in the anti-corrosive paints such as plasticizer, anti-settling agent, anti-segregation agent and the like can of course be added to the paint composition.

The amounts and the ratios for the vehicle (resin), solvent, extender pigment, coloring pigment drier and surface active agent in the paint composition as described above are the same as those in the conventional anti-corrosive paints and the various examples thereof are shown in the Examples hereinafter.

The anti-corrosive pigment of the present invention, that is, pulverized powder of the iron oxide-calcium oxide sintered composite containing more than 25% by weight of $2CaO.Fe_2O_3$ can be blended into the above paint composition in the quite same way as in the well known production process for aqueous paints, and the intended anti-corrosive aqueous paint can be obtained by mixing and dispersing the anti-corrosive pigment according to the present invention into the paint composition adjusted to a desired receipt.

A sufficient anti-corrosive effect can be obtained by blending the anti-corrosive pigment of the present invention, that is, iron oxide-calcium oxide sintered composite in such a ratio that at least more than 10% by weight, although varying somewhat depending on the purpose of use, of $2CaO.Fe_2O_3$ is contained in the total pigment in the present anti-corrosive aqueous paint. The ratio of $2CaO.Fe_2O_3$ to the total pigment in the paint is preferably between 20 and 50% by weight.

While the gellation scarely occurs in the anti-corrosive aqueous paint according to the present invention as detailed above, it is also possible in view of a further stability thereof, to prepare a master paint at first and thereafter add a solvent (water) to adjust its viscosity for the paint use.

The anti-corrosive aqueous paint according to the present invention as described above have the following merits.

(1) Since the anti-corrosive aqueous paint according to the present invention contains neither lead compounds nor chromate compounds as the anti-corrosive pigment, it neither results in the environmental pollution due to noxious metals such as Pb, Cr and the like nor gives adverse effects on human body.

(2) Since the anti-corrosive aqueous paint according to the present invention does not require an organic solvent in much amount, it neither results in the environmental pollution due to such an organic solvent nor produces adverse effects on human body.

(3) The anti-corrosive aqeuous paint according to the present invention has a long lasting anti-corrosive effect equal to or higher than that of the conventional anti-corrosive paints blended with red lead oxide, zinc chromate and the like as an anti-corrosive pigment.

(4) In the anti-corrosive aqueous paint according to the present invention, no substantial gellation in the paint, degradation in the coated film and reduction in the close adhesive power are resulted due to the anti-corrosive pigments added thereto.

The present invention is to be described hereinafter by way of Examples and Comparison Examples.

EXAMPLE 1

1000 g of $Fe_2O_3$ powder and 1270 g of $CaCO_3$ powder were well mixed together and calcinated in an electric furnace at 1250° C. for one hour to obtain an iron oxide-calcium oxide sintered composite with an iron oxide/calcium oxide ratio of 58.5 : 41.5.

Upon X-ray diffractionary, the above sintered composite was confirmed to consist of almost 100% of $2CaO.Fe_2O_3$.

Figure 2:
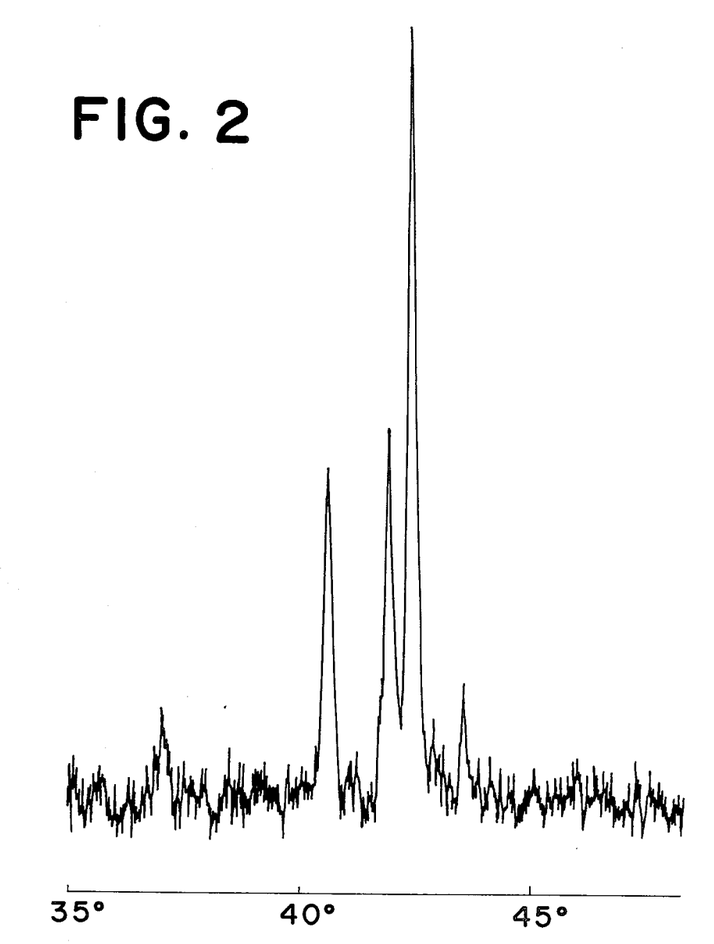
FIG. 2 is a diagram for the iron oxide-calcium oxide sintered composite obtained in Example 1 and FIG. 3 is a diagram for the iron oxide-calcium oxide sintered composite obtained in Comparison Example 1.

FIG. 2 is an X-ray diffraction diagram.

Then, the above sintered composite was coarsely pulverized (1-2 mm) in a roll crusher, subjected to a medium pulverization (3.5 μm of average particle size) by a hammer mill and then further pulverized finely in a vibration mill into powder of 1.5 μm of average particle size.

Solubility of the powder into water was measured according to the foregoing measuring method and found to be 0.5% by weight (as CaO).

70 g of the powdered iron oxide-calcium oxide sintered composite consisting of 100% of $2CaO.Fe_2O_3$ was mixed as an anti-corrosive pigment into a paint composition of the following receipt, well dispersed using a ball mill to obtain 780 g of anti-corrosive aqueous paint.

Vehicle: Acryl colloidal emulsion resin [NV (resin solid)=56%] ... 500 g
Solvent: Buthylcellosolve/water=1/1 ... 80 g
Extender pigment: Red iron oxide ($Fe_2O_3$) ... 130 g The anti-corrosive aqueous paint thus obtained was coated on a degreased rust-free steel plate to a thickness of about 75 μm, left to dry for seven days and thereafter dipped in 3% salt water of 40° C. for 40 days. Then, the coated surface was observed for the anti-corrosion test where the number of days till blister occurred in the coated film and the extent of the resulted blister after 40 days were observed. The extent of the blister was measured according to the Blister Evaluation Standard specified in "Paint Evaluation Standard" (Japan Paint Inspection Association).

As the results of the above test, blister was found initially 30 days after the dipping and the extent of the blister after 40 days was 8S.

No gellations were found at all in the above paint even left as it was for three months.

EXAMPLES 2-9

Anti-corrosive pigments were prepared in the same manner as in Example 1 excepting that the kinds and the blending ratios of the starting materials and the calcination temperature were varied and the properties thereof were measured. The anti-corrosive aqueous paints were produced in the same way as in Example 1 excepting that the ratio of $2CaO.Fe_2O_3$ was varied to the total pigments, and the anti-corrosion test was conducted. The results are shown in Table 1.

None of the paints resulted gellation at all after left as they were for three months.

COMPARISON EXAMPLE 1

The same starting mixture as in Example 1 was calcinated in an electric furnace at 950° C. for one hour to obtain an iron oxide-calcium oxide sintered composite with an iron oxide/calcium oxide ratio of 58.5/41.5.

Upon X-ray diffractiometry, the above sintered composite was found to consist of 84% of $2CaO.Fe_2O_3$.

Figure 3:
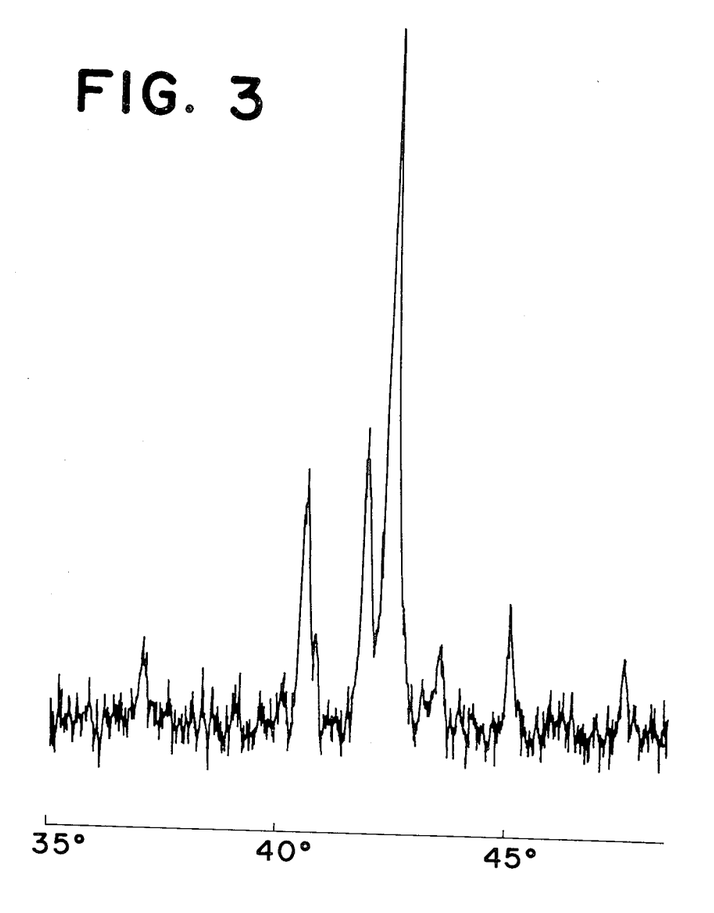

FIG. 3 is an X-ray diffraction diagram for the above sintered composite.

The above sintered composite was pulverized in a hammer mill into powder of 1 μm of average particle size. Water solubility of the powder was measured according to the foregoing measuring method and determined to be 10% by weight.

The above sintered composite was used for the production of an aqueous paint having the same composition as in Example 1, but the gellation occurred during production and the paint could not be obtained.

COMPARISON EXAMPLE 2

The same starting mixture as in Example 1 was calcinated in an electric furnace at 1100° C. for one hour to obtain an iron oxide-calcium oxide sintered composite of an iron oxide/calcium oxide ratio of 58.5:41.5.

Upon X-ray diffractiometry, the above sintered composite was conformed to contain 100% of $2CaO.Fe_2O_3$.

The above sintered composite was pulverized by a hammer mill and then further pulverized finely using a vibration mill into powder of 0.8 μm of average particle size. The water solubility of the powder was measured and determined to be 2% by weight.

Anti-corrosive aqueous paint was produced as in Example 1 using the above sintered composite and subjected to anti-corrosion test. The test results are shown in Table 1.

The storage stability for the above paint was observed to find that the viscosity of the paint increased to such an extent that could not be used as a paint (80 KV) at 15th day and the paint completely gelled at 20th day.

COMPARISON EXAMPLES 3-5

Paints were produced as in Example 1 but using equal amount of zinc chromate (ZTO), strontium chromate and red iron oxide in place of the anti-corrosive pigment in Example 1 and subjected to the anti-corrosion test. The test results were shown as Comparison Example 3, Comparison Example 4 and Comparison Example 5 respectively in Table 1.

film and the extent of the blister 20 days after the dipping were observed.

As the result of the test, it was confirmed that blister was initially formed 15 days after the dipping and the extent of the blister after 20 days was 8S.

COMPARISON EXAMPLE 6

A paint was produced in the same manner as in Example 10 excepting that the anti-corrosion pigment was replaced with an equal amount of zinc chromate (ZTO) and the anti-corrosion test was conducted. As the results, blister was observed at 17th day and the extent of the blister after 20th day was 8S.

COMPARISON EXAMPLE 7

TABLE 1

|  | Starting material and content thereof (g) | $Fe_2O_3/CaO$ in the sintered composite (wt.%) | $2CaO \cdot Fe_2O_3$ in the sintered composite (wt.%) | Calcinating temperature (°C.) | Average particle size of anti-corrosive pigment (μm) | Water-solubility of calcium (wt.%) | Ratio of $2CaO \cdot Fe_2O_3$ to total pigment in paint $(\frac{2CaO \cdot Fe_2O_3}{total\ pigment} \times 100)$ (wt.%) | Anti-corrosive test Number of days till blister occurs (days) | Extent of blister |
|---|---|---|---|---|---|---|---|---|---|
| Ex. 1 | $Fe_2O_3$ $CaCO_3$ 1000 1270 | 58.5/41.5 | 100 | 1250 | 1.5 | 0.5 | 35 | 30 | 8S |
| 2 | $Fe_2O_3$ $CaCO_3$ 1000 1270 | 58.5/41.5 | 100 | 1250 | 1.5 | 0.5 | 15 | 14 | 8S |
| 3 | $Fe_2O_3$ $CaCO_3$ 1000 1270 | 58.5/41.5 | 100 | 1250 | 1.5 | 0.5 | 25 | 21 | 8S |
| 4 | $Fe_2O_3$ $CaCO_3$ 1000 1270 | 58.5/41.5 | 100 | 1400 | 5 | 0.12 | 75 | No blister | |
| 5 | $Fe_2O_3$ $CaCO_3$ 1000 1346 | 57/43 | 100 | 1300 | 2 | 0.8 | 35 | 17 | 6S |
| 6 | $Fe_2O_3$ $CaCO_3$ 1000 720 | 70/30 | 25 | 1200 | 1.2 | 0.7 | 50 | 15 | 8S |
| 7 | $FeOOH$ $CaCO_3$ 1000 1120 | 58.5/41.5 | 100 | 1250 | 1.6 | 0.5 | 35 | 28 | 8S |
| 8 | $Fe_2O_3$ $CaO$ 1000 710 | 58.5/41.5 | 100 | 1250 | 1.5 | 0.5 | 35 | 30 | 8S |
| 9 | $Fe_3O_4$ $Ca(OH)_2$ 1000 970 | 58.5/41.5 | 100 | 1250 | 1.4 | 0.5 | 35 | 30 | 8S |
| Comparison Ex. 1 | $Fe_2O_3$ $CaCO_3$ 1000 1270 | 58.5/41.5 | 84 | 950 | 1 | 10 | 15 | Gelled during production | |
| 2 | $Fe_2O_3$ $CaCO_3$ 1000 1270 | 58.5/41.5 | 100 | 1100 | 0.8 | 2 | 25 | 10 | 6M |
| 3 | Zinc chromate (ZTO) | — | — | — | — | — | — | 8 | 0M |
| 4 | Strontium chromate | — | — | — | — | — | — | 10 | 4L |
| 5 | Rouge | — | — | — | — | — | — | 5 | 0L |

EXAMPLE 10

64 g of the anti-corrosive pigment obtained in Example 1 was mixed to a paint composition of the following receipt and dispersed thoroughly using a ball mill to obtain a 1130 g of anti-corrosive aqueous paint.

Vehicle . . . Acrylemulsion resin (NV=42.3%) . . . 750 g

Solvent . . . Isopropyl alcohol/butylcellosolve/carbitol (1/1/1/) . . . 126 g

Extender pigment . . . Red iron oxide ($Fe_2O_3$) . . . 190 g

The anti-corrosive paint thus obtained was coated on a degreased rust-free steel plate to a film thickness of about 75 μm, left to dry for seven days and then dipped in 3% salt water of 40° C. for 20 days. The coated surface was observed for the anti-corrosion test where number of days till blister initially resulted in the coated A paint was produced in the same manner as in Example 10 excepting that the anti-corrosive pigment was replaced with an equal amount of sintered composite powder obtained in Comparison Example 1 and subjected to the similar anti-corrosion test. As the result, blister was found at the first day and the extent of the blister at 20th day was OL.

COMPARISON EXAMPLE 8

A paint was produced in the same manner as in Example 10 excepting that the anti-corrosive pigment was replaced with an equal amount of red iron oxide ($Fe_2O_3$) and subjected to the similar anti-corrosion test. As the result, blister was observed at the first day and the extent of the blister after 20 days was OL.

EXAMPLE 11

30 g of the anti-corrosive pigment obtained in Example 1 was mixed with a paint composition of the following receipt and well dispersed by using a ball mill to prepare 456.2 g of anti-corrosive aqueous paint.

Vehicle . . . Alkyd colloidal emulsion resin (NV=39%) . . . 300 g
Solvent . . . Butyl cellosolve/water=1/1 . . . 30 g
Extender pigment (red iron oxide) . . . 90 g
Dryer, Co-naphthenate (6%)/Pb-naphthenate (15%)=1/4 . . . 5 g
Defoaming agent, Nopco NXZ (trade name, Sun Nopco Co.) . . . 0.6 g
Pigment dispersing agent, Demol E.P. (trade name, Kao-Atlas Co.) . . . 0.6 g The anti-corrosive paint thus produced was coated on a degreased rust-free steel plate to a thickness of about 75 μm, left to dry for seven days and dipped in running tap water for 15 days. The coated surface was observed and the anti-corrosion test was effected for the number of days till blister resulted initially in the coated film and the extent of the resulted blister 15 days after the dipping.

As the results of the test, it was confirmed that the number of days till the blister was formed initially was 10 days and the extent of the blister after 15 days was 8S.

COMPARISON EXAMPLE 9

A paint was produced in the same way as in Example 11 excepting that the anti-corrosive pigment was replaced with an equal amount of zinc chromate (ZTO) and subjected to the similar anti-corrosion test. As the test result, blister was found at the third day and the extent of the blister after 15 days was 8S.

COMPARISON EXAMPLE 10 A paint was produced in the same way as in Example 11 excepting that the anti-corrosive pigment was replaced with an equal amount of sintered composite powder obtained in Comparison Example 1 and subjected to the similar anti-corrosion test. As the result, blister was found at the first day and the coated film peeled off 15 days after.

COMPARISON EXAMPLE 11

A paint was produced in the same way as in Example 11 excepting that the anti-corrosive pigment was replace with an equal amount of red iron oxide ($Fe_2O_3$) and subjected to the similar anti-corrosion test. As the result, blister was found at fourth day and the extent of the blister after 15 days was 0 VL.

EXAMPLE 12

60 g of the anti-corrosive pigment obtained in Example 1 was mixed into a paint composition having the following receipt and well dispersed using a ball mill to prepare 494.25 g of anti-corrosive aqueous paint.

Vehicle: water soluble epoxy ester resin (NV=50%) . . . 143 g
Solvent: Butanol/butylcellosolve=2.1/1 . . . 60 g
Water . . . 75 g
Extender pigment: Red iron oxide ($Fe_2O_3$) . . . 140 g
Neutralizing agent: Triethylamine . . . 13 g
Hardening agent: Co-naphthenate (6%) solution . . . 3.25 g The anti-corrosive paint thus produced was coated on a degreased rust-free steel plate to thickness of about 75 μm, left to dry for seven days and dipped into 3% saline water of 40° C. for 20 days. Then, the coated surface was observed and the anti-corrosion test was conducted for number of days till the blister was initially observed in the coated film and the extent of the blister after 20 days.

As the results of the test, the blister was found 14 days after and the extent of the blister after 20 days was 6M.

When the steel plate coated with the same anti-corrosive paint as above was dipped in running tap water for 20 days for the anti-corrosion test, the blister was found initially after 18 days and the extent of the blister after 20 days was 8S.

What is claimed is:

1. An anti-corrosive pigment having excellent storage characteristics and substantially free from gelation under storage produced by
    (a) mixing 57-70% by weight, calculated as $Fe_2O_3$, of an iron compound selected from the group consisting of $Fe_2O_3$, $Fe_3O_4$ and FeOOH with 30-43% by weight, calculated as CaO, of a calcium compound selected from the group consisting of CaO, $CaCO_3$ and $Ca(OH)_2$;
    (b) calcining the resultant mixture at a temperature in the range of from 1250° to 1400° C. and sufficient to form an iron oxide-calcium oxide sintered composite containing at least 25% by weight of $2CaO \cdot Fe_2O_3$ having a crystal grain size of at least about 0.7 to 20 μm and a calcium oxide solubility of less than 1%; and
    (c) pulverizing the resultant sintered composite into powder having an average particle size between 0.7 and 7 μm.

2. The anti-corrosive pigment of claim 1 wherein the blending ratio for the starting material is 58.5% by weight of the iron compound calculated as $Fe_2O_3$ and 41.5% by weight of calcium compound calculated as CaO.

3. The anti-corrosive pigment of claim 1 wherein the average particle size of the powder is in a range of 1-3 μm.

4. In an anti-corrosive aqueous paint containing a film-forming resin, an aqueous vehicle and a pigment component containing an anti-corrosive pigment; the improvement comprising, as said anti-corrosive pigment, the product of claim 1.

5. The anti-corrosive aqueous paint of claim 4 wherein the paint contains at least 10% by weight of $2CaO \cdot Fe_2O_3$ based on the total amounts of pigments contained therein.

6. The anti-corrosive aqueous paint of claim 5 wherein the ratio of $2CaO \cdot Fe_2O_3$ to the total pigments in the paint is between 20 and 50% by weight.

* * * * *